(12) United States Patent
Feldgen

(10) Patent No.: US 10,880,970 B2
(45) Date of Patent: Dec. 29, 2020

(54) CIRCUIT ARRANGEMENT AND METHOD FOR DETECTING A SHORT CIRCUIT IN A LIGHTING UNIT IN A VEHICLE

(71) Applicant: HELLA GmbH & Co. KGaA, Lippstadt (DE)

(72) Inventor: Michael Feldgen, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/713,860

(22) Filed: Dec. 13, 2019

(65) Prior Publication Data

US 2020/0196421 A1    Jun. 18, 2020

(30) Foreign Application Priority Data

Dec. 13, 2018  (DE) .......... 10 2018 132 077

(51) Int. Cl.
    *B60Q 1/14*       (2006.01)
    *H05B 45/54*      (2020.01)
    (Continued)

(52) U.S. Cl.
    CPC ........... *H05B 45/54* (2020.01); *F21S 41/141* (2018.01); *H05B 45/395* (2020.01); *F21Y 2115/10* (2016.08)

(58) Field of Classification Search
    CPC .......... B60Q 1/14; B60Q 1/34; B60Q 1/1407; B60Q 1/1423; H05B 33/0815; H05B 33/0848; H05B 45/54; H05B 45/395
    (Continued)

(56) References Cited

U.S. PATENT DOCUMENTS 7,642,723 B2 *  1/2010  Ishii ................. H05B 45/14
                                                 315/77
7,755,295 B2   7/2010  Kajita et al.
                (Continued)

FOREIGN PATENT DOCUMENTS

DE    102007001501 A1    7/2007
DE    102008008217 A1    8/2008
                (Continued)

OTHER PUBLICATIONS

Texas Instruments et al., "TL431/TL432 Precision Programmable Reference," at https://components101/sites/default/files/copmponent_datasheet/tl431-datasheet.pdf, pp. 1-80 (Nov. 30, 2018).

*Primary Examiner* — Tung X Le
(74) *Attorney, Agent, or Firm* — Muncy, Geissler, Olds & Lowe, P.C.

(57) ABSTRACT

A circuit arrangement for a vehicle for detecting a short circuit in a lighting unit with a plurality of light emitting diodes connected in series, comprising a shunt regulator, a setting unit for setting the shunt regulator to a reference voltage, a voltage determination unit for determining a string voltage of the series-connected light emitting diodes and the correspondingly set reference voltage of the shunt regulator, and a detection unit for detecting a short circuit in the lighting unit on the basis of the string voltage and the reference voltage. Furthermore, the invention relates to a corresponding method for detecting a short circuit, a computer program, a memory and a vehicle.

12 Claims, 2 Drawing Sheets

(51) Int. Cl.
  *F21S 41/141*  (2018.01)
  *H05B 45/395*  (2020.01)
  *F21Y 115/10*  (2016.01)

(58) Field of Classification Search
  USPC .................................................. 315/77, 82
  See application file for complete search history.

(56) References Cited

U.S. PATENT DOCUMENTS

| 7,777,495 | B2* | 8/2010 | Mannerfelt | B60Q 11/005 |
| | | | | 324/414 |
| 9,883,565 | B2 | 1/2018 | Regau | |
| 2005/0062445 | A1* | 3/2005 | Toyota | H05B 45/00 |
| | | | | 315/312 |
| 2006/0082332 | A1* | 4/2006 | Ito | H05B 45/37 |
| | | | | 315/291 |
| 2007/0114951 | A1* | 5/2007 | Tsen | H05B 45/46 |
| | | | | 315/291 |
| 2012/0217873 | A1* | 8/2012 | Tanaka | H05B 45/37 |
| | | | | 315/82 |
| 2013/0016310 | A1* | 1/2013 | Kanemitsu | G08B 5/36 |
| | | | | 349/69 |
| 2013/0020946 | A1* | 1/2013 | Boezen | H05B 45/50 |
| | | | | 315/127 |
| 2016/0066372 | A1* | 3/2016 | Lombardi | H05B 45/50 |
| | | | | 315/77 |
| 2017/0048935 | A1* | 2/2017 | Koo | H05B 45/48 |

FOREIGN PATENT DOCUMENTS

| DE | 102012107766 A1 | 2/2013 |
| DE | 102014112176 A1 | 3/2015 |
| DE | 102014216085 A1 | 2/2016 |
| DE | 10 2015 008 110 A1 | 12/2016 |

* cited by examiner

CIRCUIT ARRANGEMENT AND METHOD FOR DETECTING A SHORT CIRCUIT IN A LIGHTING UNIT IN A VEHICLE

This nonprovisional application claims priority under 35 U.S.C. § 119(a) to German Patent Application No. 10 2018 132 077.9, which was filed in Germany on Dec. 13, 2018, and which is herein incorporated by reference.

BACKGROUND OF THE INVENTION

Field of the Invention

The present invention relates to a circuit arrangement and to a method for detecting a short circuit in a lighting unit. In addition, the invention relates to a computer program for detecting a short circuit in a lighting unit, to a memory having a computer program stored thereon and to a vehicle in which a short circuit in a lighting unit can be detected.

Description of the Background Art

The complexity of lighting circuits in the automotive sector is constantly increasing. Current lighting systems are no longer limited to individual light sources, but often have multiple light sources that achieve the required or desired lighting effect, for example in the form of multiple light emitting diodes connected in series. That is, to generate the desired light function, several light emitting diodes are now connected in series with each other and supplied via a constant current source with a common supply voltage.

As described in the German patent application DE 10 2008 008 217 A1, the failure of light sources in vehicle headlights or lighting units for motor vehicles usually occurs due to interruptions, such as in lamps with a filament. Even when using light emitting diodes as light sources, the failure of one or more light emitting diodes is usually due to an interruption. However, although less likely, it could also be due to a short circuit of one or more light emitting diodes.

The automotive industry is calling for the ability to detect the short circuit of even a single light emitting diode, i.e., to detect when in a series circuit with multiple light emitting diodes even a single light emitting diode has a short circuit. Due to large voltage tolerances, however, in a series connection of multiple light emitting diodes in generic circuit arrangements, it is possible only with difficulty and with a correspondingly great expense, i.e., only by means of complex electronics, to detect a short circuit of a single light emitting diode using total voltage monitoring of a series connection of the light emitting diodes. A generic method for determining a short circuit can be found for example in DE 10 2014 112 176 A1, which corresponds to U.S. Pat. No. 9,883,565.

According to DE 10 2008 008 217 A1, a circuit arrangement for detecting a short circuit of one or more light emitting diodes is proposed, wherein two or more light emitting diodes are provided for realizing at least one light function for a headlight or a lighting unit of a motor vehicle, and the light emitting diodes are connected in series and via a constant current source to a supply voltage source.

In view of the available prior art, the desire persists for an even simpler and/or more accurate system for detecting a short circuit in a generic lighting unit.

SUMMARY OF THE INVENTION

It is therefore an object of the present invention to provide a circuit arrangement by means of which a short circuit in a lighting unit with a series connection of a plurality of light emitting diodes can be detected in a simple and reliable manner. A further object of the invention is to provide a corresponding method and a computer program product for the simple and reliable detection of a short circuit in such a lighting unit. Moreover, it is an object of the invention to find a memory on which such a computer program product is stored, as well as a vehicle with a circuit arrangement designed therein, for the simple and reliable detection of a short circuit in such a lighting unit.

According to an exemplary embodiment of the present invention, a circuit arrangement for a vehicle is provided for detecting a short circuit in a lighting unit with a plurality of light emitting diodes connected in series. The circuit arrangement further has a shunt regulator and a setting unit for setting the shunt regulator to a reference voltage, a voltage determination unit for determining a string voltage of the series-connected light emitting diodes and the correspondingly set reference voltage of the shunt regulator. In addition, the circuit arrangement has a detection unit for detecting a short circuit in the lighting unit based on the string voltage and the reference voltage.

With the aid of the circuit arrangement, even a single short circuit in the lighting unit can be detected reliably and quickly. This is possible in particular through the use of the shunt regulator according to the invention. In experiments within the scope of the present invention, it has been recognized that standard components in a controller used in conventional circuit arrangements cannot provide the desired quality for detecting a short circuit. Therefore, the known systems were abandoned, and after a variety of different experiments, a shunt regulator has been recognized as a preferred reference component. In particular, a shunt regulator in the form of a TL431 or TL432 is used and has a tolerance of approx. 0.5% with a temperature drift of approx. 6 mV over the entire temperature range.

Based on the reference voltage and the string voltage, it can be easily determined whether or not a short circuit is present at the corresponding light emitting diode. If the string voltage deviates, for example, from the reference voltage by a predefined value, it can be recognized that a short circuit exists. If there is a difference between the string voltage and the reference voltage in a predefined setting, it can be detected that there is no short circuit. Thus, the short circuit can be detected by comparison between the reference voltage and the string voltage. For this purpose, a comparison unit and/or a unit for carrying out the comparison between the reference voltage and the string voltage can be configured accordingly.

The detection unit may be configured and adapted to compare the reference voltage with the string voltage, to determine a difference voltage between the reference voltage and the string voltage based on the comparison, to compare the detected difference voltage to a predefined threshold voltage, and to detect a short in a light emitting diode when the differential voltage is greater than the threshold value. The string voltage may be understood to be the total voltage at all the series-connected light emitting diodes.

It is also possible that, in the circuit arrangement, the setting unit for setting the reference voltage is configured based on the forward voltage of one of the light emitting diodes. That is, the reference voltage is adjusted to the respective forward voltage of the light emitting diodes, that is, set to the forward voltage of one of the light emitting diodes, which is multiplied by the number of light emitting diodes used and then compared with the string voltage or set to a definable ratio for detecting the short circuit. This allows for the reference voltage to be set on the shunt regulator in a simple and fast manner.

Furthermore, it is possible with a circuit arrangement according to the invention that the circuit arrangement has a shut-off unit for switching off the lighting unit on the basis of the string voltage and the reference voltage. By means of the shut-off unit, it is possible to prevent further light emitting diodes and/or further components of the circuit arrangement or of the vehicle from being damaged or destroyed by a short circuit in a light emitting diode or in the lighting unit. With regard to the use of the reference voltage and the string voltage, what is written above for the detection of the short circuit applies in an analogous manner.

It is also possible that in a circuit arrangement according to the present invention a signal output unit is provided for outputting a warning signal for switching off the lighting unit based on the string voltage and the reference voltage. Using the warning signal for switching off the lighting unit or the recommendation to switch off the lighting unit, a user of the vehicle can promptly arrange for the repair or replacement of the lighting unit before the lighting unit possibly fails completely in an unfavorable situation. The signal output unit may be configured and adapted to send the warning signal to a signal converter of the circuit arrangement or the vehicle for the acoustic and/or optical output of the warning signal to the user of the vehicle or the circuit arrangement.

A method of detecting a short circuit in a lighting unit having a plurality of light emitting diodes connected in series is provided by a circuit arrangement as described above. The method comprises, for example: setting the shunt regulator to a reference voltage by the setting unit, determining a string voltage of the series-connected light emitting diodes and the reference voltage of the shunt regulator by the voltage determination unit, and detecting a short circuit in the lighting unit by the detection unit based on the string voltage and the reference voltage.

Thus, the inventive method has the same advantages as they have been described in detail with respect to the circuit arrangement according to the invention.

As already described above for the circuit arrangement, it is furthermore possible within the scope of the method for the reference voltage to be set on the basis of the forward voltage of one of the light emitting diodes. The lighting unit can be switched off on the basis of the string voltage and the reference voltage by a shut-off unit. On the basis of the string voltage and the reference voltage, a warning signal for switching off the lighting unit can be output by a signal output unit.

A computer program is also provided that includes instructions that, when the computer program is executed by the computer, cause the latter to perform the method described above. The computer program may be implemented as a computer-readable instruction code in any suitable programming language such as JAVA, C++ or C#. The computer program may be stored on a computer-readable storage medium such as a data disk, a removable drive, a volatile or nonvolatile memory, or a built-in memory/processor. The instruction code may program a computer or other programmable device, such as a vehicle controller, to perform the desired functions. Further, the computer program may be provided in a network, such as the Internet, from which it may be downloaded by a user as needed. The computer program can be realized both by means of software and by one or more special electronic circuits, i.e., in hardware in the form of a computer program product, or in any hybrid form, i.e., by means of software components and hardware components.

In addition, a memory is provided with such a computer program stored on the memory. The memory may be configured as a data carrier in the form of a memory pen, a memory disk, a hard drive or even a control device or the like. In addition, the present invention comprises a vehicle having at least one lighting unit and a circuit arrangement as described above, which is configured and adapted to detect a short circuit in the lighting unit, wherein the lighting unit is configured in the form of a vehicle headlight or inside a vehicle headlight.

Thus, the computer program according to the invention, the memory according to the invention and the vehicle according to the invention also provide the advantages described above.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
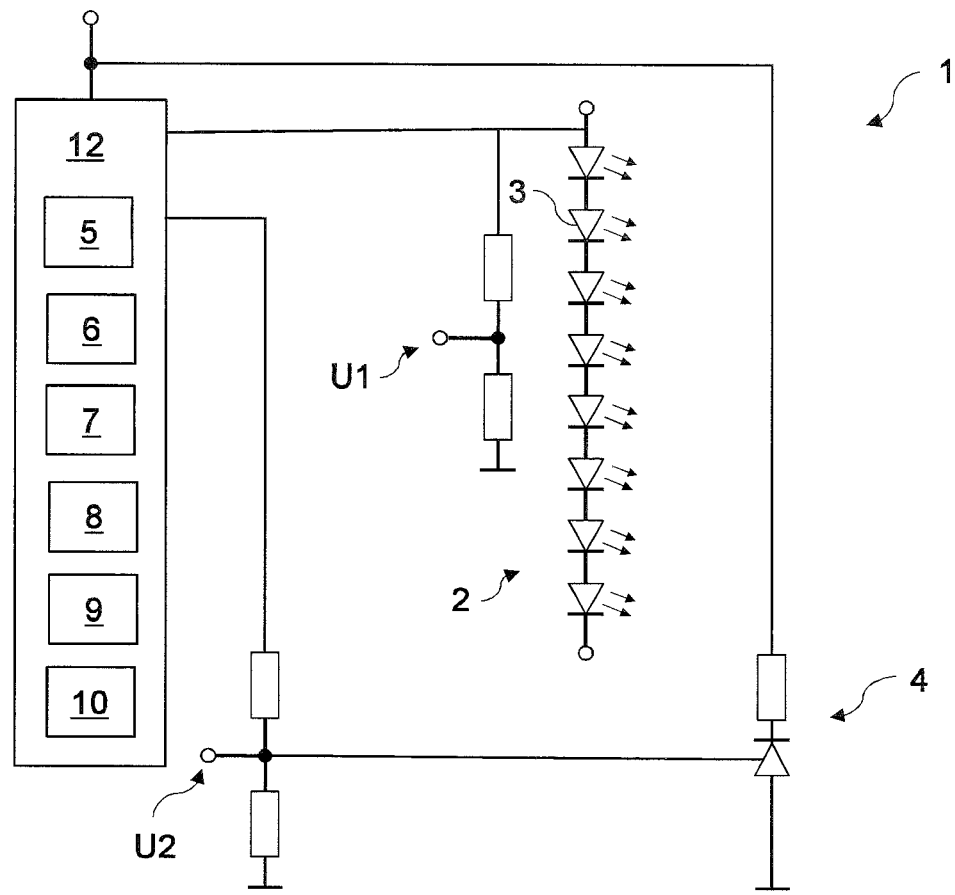
FIG. 1 is a circuit arrangement according to a preferred embodiment of the present invention.

FIG. 1 shows a circuit arrangement 1 for a vehicle 11 for detecting a short circuit in a lighting unit 2 with a plurality of series-connected light emitting diodes 3. That is, it can be detected with the circuit arrangement 1 shown in FIG. 1 if a short circuit is already present at a particular light emitting diode 3 of the lighting unit 2. For this purpose, the circuit arrangement 1 has a shunt regulator 4, a setting unit 7 for setting the shunt regulator 4 to a reference voltage U2 or for setting a reference voltage on the shunt regulator 4, a voltage determination unit 5 for determining a string voltage U1 of the series-connected light emitting diodes 3 and the correspondingly set reference voltage U2 of the shunt regulator 4, and a detection unit 6 for detecting a short circuit in the lighting unit 2 on the basis of the string voltage U1 and the reference voltage U2.

In this case, the setting unit 7 is configured to set the reference voltage U2 on the basis of the forward voltage of one of the light emitting diodes 3. The circuit arrangement 1 further has a shut-off unit 8 for switching off the lighting unit 2 on the basis of the string voltage U1 and the reference voltage U2. In addition, the circuit arrangement 1 has a signal output unit 9 for outputting a warning signal for switching off the lighting unit 2 on the basis of the string voltage U1 and the reference voltage U2.

Figure 3:
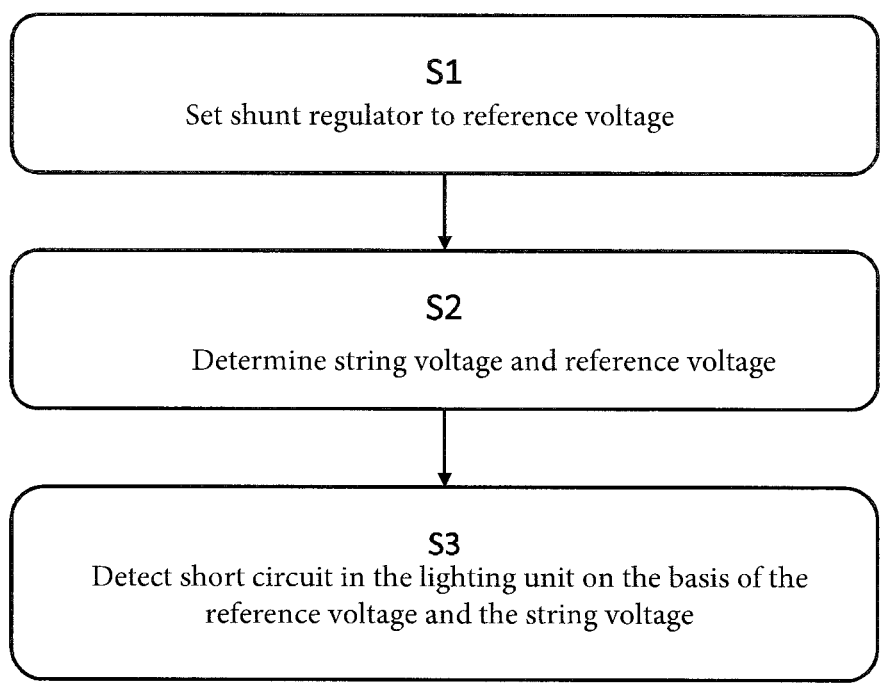
FIG. 3 is a flow chart for explaining a method according to a preferred embodiment of the present invention.

According to the circuit arrangement 1 shown in FIG. 1, the voltage determination unit 5, the detection unit 6, the setting unit 7, the shut-off unit 8 and the signal output unit 9 are integrated into a control unit 12 in the form of a vehicle controller, in which also a computer program 10 for executing a method later described with reference to FIG. 3 is installed.

In the control unit 12, the temperature drift and/or the aging drift of the light emitting diodes 3 can be stored and taken into account or used accordingly when identifying the short circuit.

Figure 2:
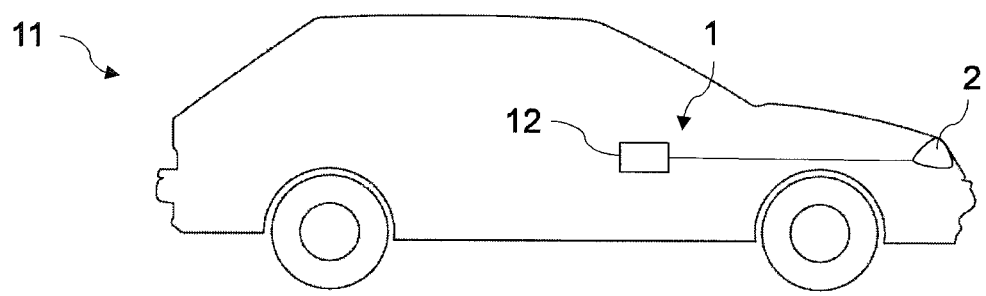
FIG. 2 is a vehicle with a circuit arrangement as shown in FIG. 1.

FIG. 2 shows a vehicle 11 with a control unit 12 and two lighting units 6 in the form of two vehicle headlights. The vehicle has a circuit arrangement 1 as described above, which is configured and adapted to detect a short circuit in one of the lighting units 6.

With reference to FIG. 3, a method for detecting a short circuit in the lighting unit 2 by means of a circuit arrangement 1 as described above will be explained below. For this purpose, in a first step S1, the shunt regulator 4 is first set by the setting unit 7 to a reference voltage. Subsequently, in a step S2, a string voltage U1 of the light emitting diodes 3 connected in series as well as the reference voltage U2 of the shunt regulator 4 are determined by the voltage determination unit 5. Thereupon, in a third step S3, a short circuit in the lighting unit 2 can be detected by the detection unit 6 on the basis of the string voltage U1 and the reference voltage U2. Preferably, this method is performed in lighting units with up to eight light emitting diodes connected in series. The reference voltage U2 is set in this case on the basis of the forward voltage of one of the light emitting diodes 3.

In addition to the illustrated embodiments, the invention allows for further design principles. That is, the invention should not be considered to be limited to the embodiments explained with reference to the figures.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit arrangement for a vehicle for detecting a short circuit in a lighting unit with at least two light emitting diodes connected in series, the circuit arrangement comprising:
   a shunt regulator;
   a setting unit to set the shunt regulator to a reference voltage;
   a voltage determination unit to determine a string voltage of the series-connected light emitting diodes and the correspondingly set reference voltage of the shunt regulator, the string voltage comprising a total voltage at all of the series-connected light emitting diodes; and
   a detection unit to detect the short circuit in the lighting unit based on the string voltage and the reference voltage,
   wherein the setting unit is configured to set the reference voltage based on a forward voltage of one of the at least two light emitting diodes.

2. The circuit arrangement according to claim 1, wherein the circuit arrangement has a shut-off unit for switching off the lighting unit based on the string voltage and the reference voltage.

3. The circuit arrangement according to claim 1, wherein the circuit arrangement has a signal output unit for outputting a warning signal for switching off the lighting unit based on the string voltage and the reference voltage.

4. A vehicle, comprising:
   the lighting unit; and
   the circuit arrangement according to claim 1,
   wherein the lighting unit is a vehicle headlight.

5. A method for detecting a short circuit in a lighting unit with at least two light emitting diodes connected in series by a circuit arrangement, the circuit arrangement comprising:
   a shunt regulator;
   a setting unit to set the shunt regulator to a reference voltage;
   a voltage determination unit to determine a string voltage of the series-connected light emitting diodes and the correspondingly set reference voltage of the shunt regulator; and
   a detection unit to detect the short circuit in the lighting unit based on the string voltage and the reference voltage,
   wherein the method comprises:
      setting the shunt regulator to a reference voltage by the setting unit;
      determining a string voltage of the series-connected light emitting diodes and the reference voltage of the shunt regulator by the voltage determination unit; and
      detecting the short circuit in the lighting unit by the detection unit based on the string voltage and the reference voltage.

6. The method according to claim 5, wherein the reference voltage is set based on the forward voltage of one of the at least two light emitting diodes.

7. The method according to claim 5, wherein the lighting unit is switched off by a shut-off unit based on the string voltage and the reference voltage.

8. The method according to claim 5, wherein, based on the string voltage and the reference voltage, a warning signal for switching off the lighting unit is output by a signal output unit.

9. A computer program comprising instructions which, when the computer program is executed by a computer, cause the computer program to perform the method according to claim 5.

10. A memory with the computer program according to claim 9 stored thereon.

11. A method for detecting a short circuit in a lighting unit with at least two light emitting diodes connected in series by a circuit arrangement, the method comprising:
   setting, by a setting unit, a shunt regulator to a reference voltage;
   determining, by a voltage determination unit, a string voltage of the light emitting diodes connected in series and the reference voltage of the shunt regulator; and
   detecting, by a detection unit, the short circuit in the lighting unit based on the string voltage and the reference voltage.

12. The method according to claim 11, wherein the string voltage comprises a total voltage at all of the series-connected light emitting diodes, and
   wherein the reference voltage is based on a forward voltage of one of the at least two light emitting diodes.

* * * * *